Oct. 22, 1929.  G. P. A. WEISENBORN  1,732,347
BAKER AND ROASTER
Filed Dec. 5, 1927  2 Sheets-Sheet 1

Inventor:
George P. A. Weisenborn
By Chas. P. Soper
atty.

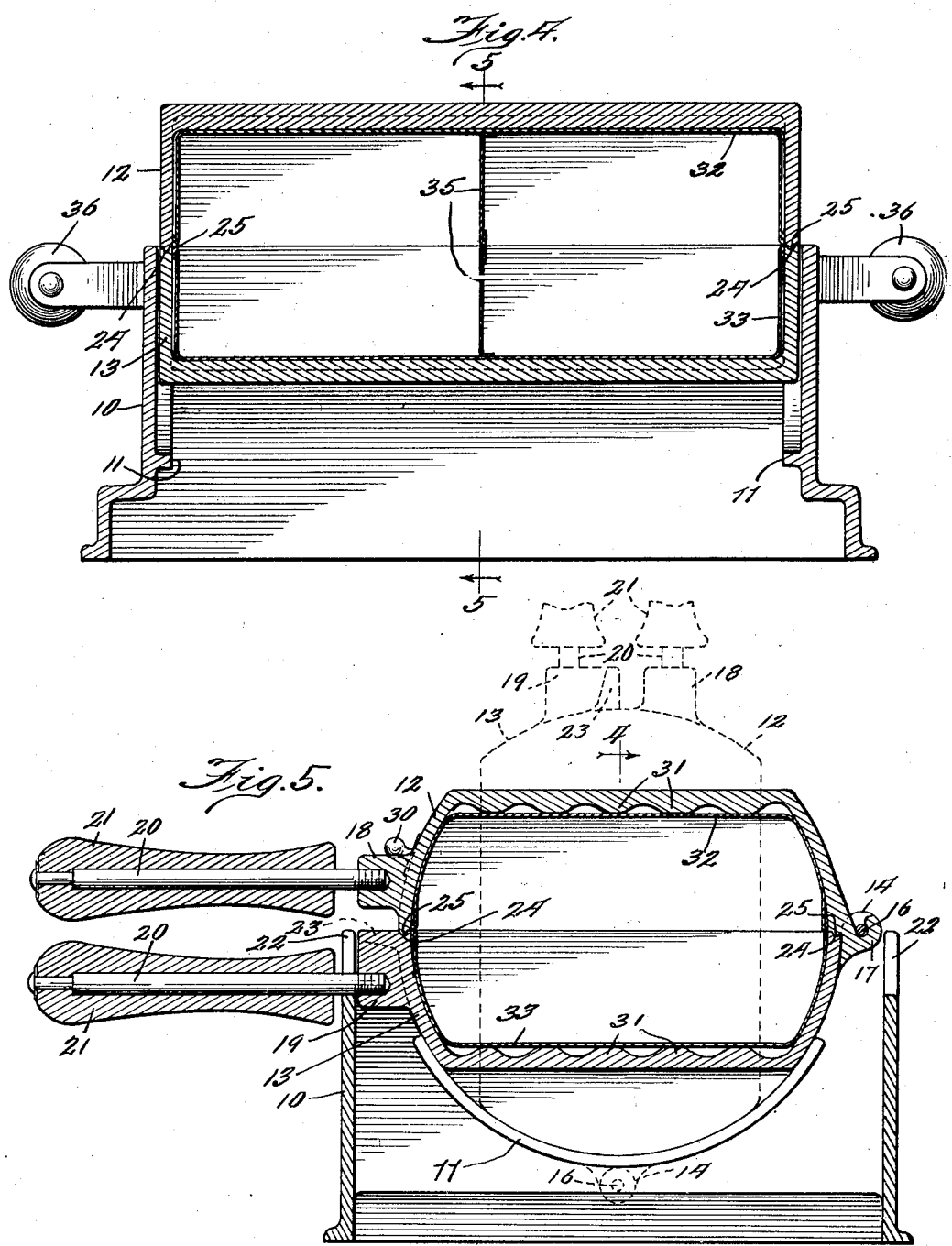

Patented Oct. 22, 1929

1,732,347

UNITED STATES PATENT OFFICE

GEORGE P. A. WEISENBORN, OF OAK PARK, ILLINOIS

BAKER AND ROASTER

Application filed December 5, 1927. Serial No. 237,759.

This invention relates to an improvement in bakers and roasters and more particularly to a baker and roaster which may be heated over an ordinary kitchen range, gas burner, electric heater or any heating device having a substantially horizontal heating surface.

The object of the invention is the provision of a device of the above described character by means of which meat, potatoes and like foods may be baked or roasted on top of any ordinary stove or heating element and which may be quickly and easily operated to "turn" the roast or other food being cooked without opening the roaster or removing it from the heating device.

One of the features of the invention is the roasting or baking compartment formed of two similar parts so mounted on the supporting base or oven that the device may be rotated through substantially 180° so that the half of the compartment formerly down will be uppermost and vice versa.

Another feature of the invention is the inner shell or liner which may be arranged to divide the baker into two or more compartments separate from each other, thus permitting the roasting or baking of different articles without their becoming in any way mixed with each other.

Another feature of the invention resides in the base or oven member within the top of which the baker is mounted and which acts to confine the heat and direct it into contact with the baker.

A still further feature resides in the manner of joining the two parts of the baker so they may be disconnected very readily and used separately.

Other features and advantages will appear from time to time as the description of the invention progresses.

It is believed the further disclosure of the invention will be understood most readily from a detailed description thereof in connection with the accompanying drawings in which Fig. 1 is a view of one edge of the baker sections with the handles removed;

Fig. 4 is a longitudinal section through the baker and its supporting base, and

Fig. 5 is a section substantially on the line 5—5 of Fig. 4.

Figure 1:
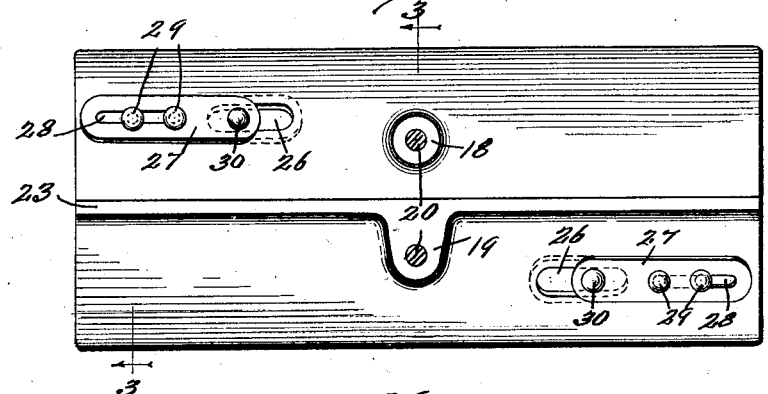

Referring now to the drawings, in which like reference characters indicate like parts in the several views, 10 indicates the supporting base for the baker receptacle which acts to confine the blaze or other source of heat and direct it to the lowermost of the baker sections, one of which is at all times mounted within the top of the base or oven member 10.

In the present embodiment of the invention, the oven member 10, is substantially rectangular in horizontal cross section and the opposite sides and opposite ends are parallel, although, obviously, it may have any form necessary to fit the contour of the baker receptacle. Each of the end walls of the member 10 is provided with an inwardly directed arcuate flange 11, the purpose of which, will presently appear.

The two baker sections are indicated at 12 and 13, respectively, in each of the figures of the drawings. These baker sections are substantially alike except for the differences which will be hereinafter pointed out. Each section has, in general, the form of an elongated basin or deep tray, substantially rectangular in horizontal cross section and of a size and form approximately to fit within the top of the oven member 10, as clearly indicated in Figs. 4 and 5.

The side walls of the sections 12 and 13, however, are formed as arcs of a circle of the same size as the arcuate flanges 11. The bottom or top, as the case may be, of each receptacle or baker section is flattened, in the preferred embodiment of the invention, although, if desired, the baker sections may be formed as substantially semi-circular in vertical cross section.

Figure 2:
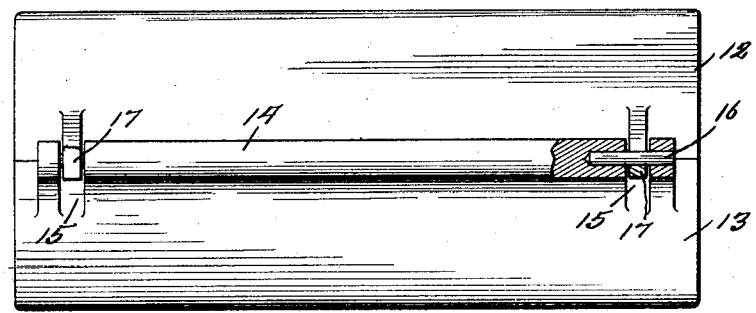
Fig. 2 is a view of the baker of Fig. 1 from the opposite direction, showing the hinge connecting means at one edge thereof.
Figure 3:
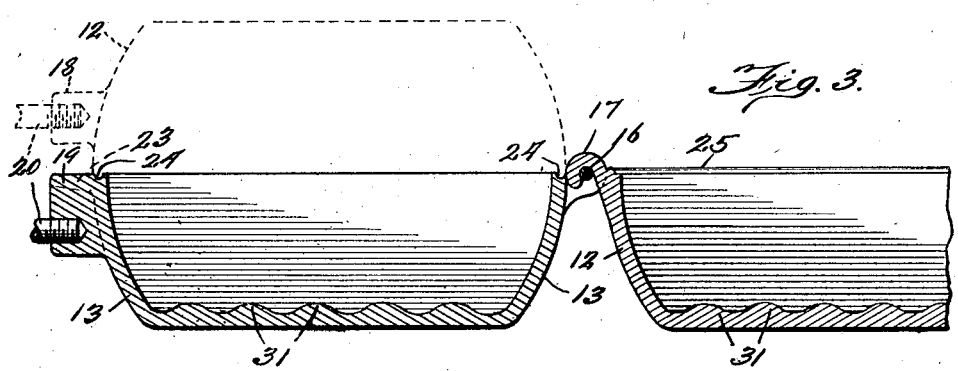
Fig. 3 is a section on the line 3 of Fig. 1 but showing in full lines the baker sections moved to open position and in dotted lines their relative positions when closed.

The sections 12 and 13 are arranged to be pivotally joined by means of the hinge structure shown in Figs. 2, 3 and 5 of the drawings. Section 13, along one upper edge, is provided with the laterally extending bead 14. Bead 14, adjacent to each end, thereof, is cut away as indicated at 15. Each end of bead 14 is provided with a longitudinal hole or bore and a pin 16, positioned therein, extends across the space 15 and forms a pintle for the hinge. Baker section 12, adjacent to each end thereof, and at positions corresponding to the cut away portions 15 of flange 14 is provided with a hooklike projection 17, adapted to be positioned about the corresponding pin 16, in a manner obvious from an inspection of Fig. 3, the pins 16 and hooks 17 uniting to form a pair of hinges pivotally joining the sections 12 and 13 at one of their meeting edges.

Baker sections 12 and 13, substantially centrally of their edges opposite to the hinge structure, are provided with the lugs 18 and 19, respectively. These lugs are bored and tapped to receive the threaded ends of the pins 20, each of which carries a handle 21.

Referring now to Figs. 4 and 5 of the drawings, it will be noted that the ends of the arcuate surfaces of baker section 13 rest on the arcuate flanges 11 when the baker is placed within the top of the oven member or base 10. In this position, when it is desired to place the section 12 lowermost, in order to "turn" the food in the baker, the handles 21 are grasped to maintain the baker sections firmly closed and the baker is then rotated in a clockwise direction, as viewed in Fig. 5, through an arc of about 180°, thus completely reversing the relative positions of the baker sections. During this turning or reversing movement, the baker is pivotally supported and guided by the flange 11. The engagement of the ends of the baker with the walls of the oven also assists in maintaining the baker in proper position.

It will be noted that the sides of the base or oven member 10 are provided with notches 22 to receive the pins 20. It will also be seen from Figs. 1 and 5 that section 13 at its edge opposite to bead 14, is provided with a corresponding bead 23, which bridges the space between the edge of section 13 and the adjacent side of the oven member 10.

The edge of baker section 13 is provided with a groove 24, adapted to receive the reduced edge of the section 12. This construction produces a very tight contact between the baker sections so as to prevent the escape of any liquids within the baker when the sections are reversed. This tight connection also retards the escape of steam or vapor from the baker. In baking or roasting certain foods, as potatoes and the like, it is desirable to permit the escape of the vapor. To accomplish this each of the baker sections is provided with a vent opening 26 adapted to be regulated or closed by a sliding cover plate 27. Each plate 27 has a longitudinal slot 28, through which extend the pins 29 fixed in the sections 12 and 13, respectively. Projecting from each plate 27 is a lug or button 30 which may be grasped to facilitate the adjustment of its plate 27 over the vent opening 26.

The inner surfaces of the bottoms of sections 12 and 13 are preferably corrugated as shown at 31 in Figs. 3 and 5, in order to maintain the food spaced, as much as possible, from the bottom of the baker. Where liquids are present, this permits the liquids to collect under the food, as when meat is being roasted. It also assists in preventing burning even when no liquids are present.

Another function of the corrugations 31 is to assist in basting meat being roasted in the device. The steam will condense on the top wall of the baker, then run to the lower edges of the corrugations and drip off on the meat. When it is desired to divide the baker into two or more sections, an inner liner may be provided. This liner or inner shell, as shown in Figs. 4 and 5, consists of two similar sections 32 and 33, snugly fitting within the baker sections 12 and 13, respectively. Each liner section may be provided intermediate its ends with one or more partitions as 35, the partitions of the two sections being correspondingly positioned so their meeting edges will abut and form separate tight compartments. When thus arranged, different foods may be placed in the compartments and kept absolutely separate.

For convenience in handling, the oven or base 10 may be provided at the opposite ends with the handles 36.

It is obvious that the present baker may be made in any desired size, small enough to be utilized as light traveling equipment or large enough to accommodate a large turkey or roast.

It has been found, when using the present baker over a gas burner, that after the device has been initially heated only an exceedingly low flame is required to maintain the baker at a satisfactory temperature.

In roasting meat or fowl, after the baker has become well heated and the meat partially roasted, the baker will be reversed as above explained, thus reversing the position of the meat relative to the source of heat. This reversing process also acts to bring the section of the baker formerly toward the source of heat uppermost and thus secure a more uniform heat within the baker. When reversed, the meat will be basted also as part of the liquids will be carried around and will drop onto the meat. This reversing process may be performed several times while a fowl, roast, chops, potatoes or other food is being cooked and as the device will preferably be used on top of the stove, it may be reversed quickly without inconvenience or danger of burning the operator.

The present device may also be employed to bake cookies, biscuits, muffins and the like. In using it for this purpose it will preferably be well heated, then the biscuits or the like will be inserted in a basin, drip pan or one of the inner liners 32 or 33. To do this the baker need not be removed from the oven 10 as the uppermost section of the baker can be lifted or rotated in relation to the lowermost section, at any time in order to open the baker. In order to get heat applied uniformly to the top as well as the bottom of the biscuits, it may be desirable to reverse the position of the baker just before the biscuits are inserted.

Due to the nature of the hinge connection between the baker sections, the sections may be readily separated and used as separate cooking utensils.

While in the drawings and in the above description but a single embodiment of the invention is disclosed, it is to be understood that the inventor contemplates many changes in the size and shape of the parts and in the details of construction. The invention, therefore, should be limited only by the scope of the appended claims.

Having thus described my invention, what I claim as new and desire to secure by Letters Patent of the United States is:

1. In a baker, an oven member, a baker comprising two similar basinlike sections positioned within the upper portion of said oven section, means pivotally joining said sections at one side thereof, means pivotally supporting said baker sections from said base whereby said baker may be rotated substantially 180 degrees to reverse the position of said baker in relation to said oven member, liners or inner shells closely fitting within said sections, respectively, and partitions correspondingly placed within said shells, the adjacent edges of said partitions being substantially in engagement and dividing the baker into separate compartments.

2. In a baker, a base or oven member, a baker comprising two similar basinlike sections positioned within the upper portion of said oven section, means pivotally but detachably joining said sections at one side thereof, means pivotally supporting said baker sections from said base whereby said baker may be rotated substantially 180 degrees to reverse the position of said baker in relation to said oven member, liners or inner shells closely fitting within said sections, respectively, and partitions correspondingly placed within said shells, the adjacent edges of said partitions being substantially in engagement and dividing said baker into separate compartments.

3. In a baker, a base or oven member, a baker comprising two similar basinlike sections arranged with their edges together to form a closed compartment, positioned within the upper portion of said oven section, means pivotally joining said sections at one side thereof, means pivotally supporting said baker sections from said base whereby said baker may be rotated substantially 180 degrees to reverse the position of said baker in relation to said oven member, liners or inner shells closely fitting within said sections, respectively, and partitions correspondingly placed within said shells, the adjacent edges of said partitions being substantially in engagement and dividing said baker into separate compartments.

4. In a baker, a base or oven member, a baker comprising two similar basin-like sections arranged with their edges together to form a closed compartment, positioned within the upper portion of said oven member, hinges pivotally joining said sections at one side thereof, arcuate flanges, one projecting inwardly from each end of said oven member, and corresponding arcuate surfaces one at each end of each of said baker sections, arranged to engage said flanges, respectively, pivotally to support said baker sections from said base whereby said baker may be rotated substantially 180 degrees to reverse the position of said baker sections in relation to said over member.

In testimony whereof I have signed this specification.

GEORGE P. A. WEISENBORN.